(12) United States Patent
Sherwin

(10) Patent No.: US 6,725,764 B2
(45) Date of Patent: Apr. 27, 2004

(54) METHOD AND APPARATUS FOR COOKING POULTRY AND FOWL

(76) Inventor: Richard B. Sherwin, 15519 129th St., Lemont, IL (US) 60439

(*) Notice: Subject to any disclaimer, the term of this patent is extended or adjusted under 35 U.S.C. 154(b) by 0 days.

(21) Appl. No.: 10/404,245

(22) Filed: Apr. 1, 2003

(65) Prior Publication Data

US 2004/0003725 A1 Jan. 8, 2004

Related U.S. Application Data

(63) Continuation-in-part of application No. 10/190,259, filed on Jul. 8, 2002, now Pat. No. 6,557,461.

(51) Int. Cl.$^7$ ............................. A23L 1/00; A22C 21/00; A47J 37/00; A47J 37/04
(52) U.S. Cl. .............................. 99/419; 99/345; 99/426; 99/447
(58) Field of Search .................. 99/339, 340, 345–347, 99/400, 401, 419–421 V, 426, 407, 44–450, 441, 442; 426/282, 132, 420, 523, 644

(56) References Cited

U.S. PATENT DOCUMENTS

| | | | |
|---|---|---|---|
| 1,485,253 A | 2/1924 | Devlin | |
| 1,979,501 A | 11/1934 | Stephin | |
| 2,404,166 A | 7/1946 | Danilla | |
| 2,835,480 A | 5/1958 | Perez | |
| 2,918,561 A | 12/1959 | Perez | |
| 3,584,683 A | 6/1971 | Gordon | |
| 3,709,151 A | 1/1973 | Cook et al. | |
| 3,858,029 A | * 12/1974 | Walter | 219/222 |
| 3,899,657 A | 8/1975 | Johnson | |
| 3,965,808 A | 6/1976 | Chomette | |
| 3,980,010 A | 9/1976 | Collinucci | |
| 4,127,060 A | 11/1978 | Curtis | |
| 4,194,015 A | 3/1980 | Colato | |
| 4,294,168 A | 10/1981 | Redhead | |
| 4,301,509 A | 11/1981 | Haase et al. | |
| 4,738,192 A | 4/1988 | Odom, Jr. | |
| 4,810,856 A | 3/1989 | Jovanovic | |
| 5,106,642 A | 4/1992 | Ciofalo | |
| 5,301,602 A | 4/1994 | Ryczek | |
| 5,586,489 A | * 12/1996 | Fraga | 99/419 |
| 5,662,028 A | 9/1997 | Fraga | |
| 5,690,980 A | 11/1997 | Fraga | |
| 5,893,320 A | 4/1999 | Demaree | |
| 5,918,534 A | 7/1999 | Medina | |
| 5,981,908 A | 11/1999 | Mcguire et al. | |
| 6,265,004 B1 | 7/2001 | Cagle | |
| 6,416,804 B1 | 7/2002 | Sherwin | |

* cited by examiner

*Primary Examiner*—Timothy F. Simone
(74) *Attorney, Agent, or Firm*—Meroni & Meroni, P.C.; Charles F. Meroni, Jr.

(57) ABSTRACT

A segmented elongate, hollow convection pipe formed with an angled mid portion having a removable closed piercing cap or tip for piercing through the body cavity of stuffed poultry during cooking and preparation to cooking the closed end prevents dressing or stuffing from clogging the pipe when the stuffing is pierced by the tip of the hollow convection pipe. The tip is then removed for convection cooking. Each segment and the piercing cap or tip has a locking connection to enable the convection pipe segments to be securely locked together. The convection pipe is provided in plural individual sections of tubing that are serially joined in end-to-end relation. Overall length of the pipe can be adjusted by connecting greater or fewer numbers of sections of tubing, as required. Overall cooking time of both the poultry and the stuffing is more uniform and reduced as a result of simultaneous cooking from the inside as well as the outside. A method is provided for using the convection pipe to safely, quickly pierce the prestuffed turkey and then uniformly cook a raw, stuffed poultry.

18 Claims, 4 Drawing Sheets

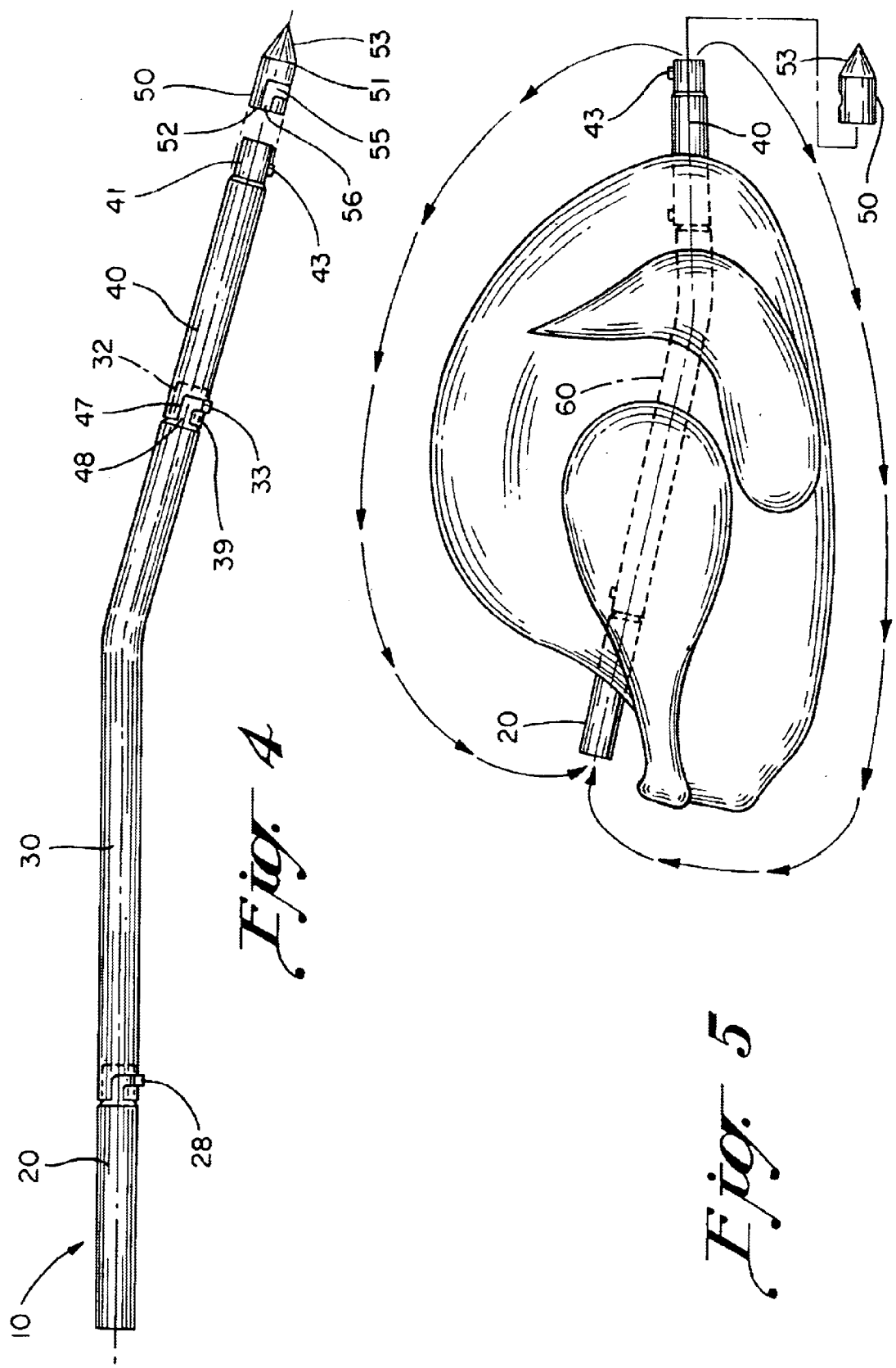

METHOD AND APPARATUS FOR COOKING POULTRY AND FOWL

This application is a Continuation-In-Part of U.S. Ser. No. 10/190,259 filed Jul. 8, 2002 now U.S. Pat. No. 6,557,461.

BACKGROUND OF THE INVENTION

Every year, the Centers for Disease Control and Prevention Estimates that 300,000 people in the United States are hospitalized, and 5,000 people, mostly the very young, the elderly and those with compromised immune systems, die from food borne illness. A staggering 76 million people are sickened due to food borne illnesses[1]. These numbers are conservative because millions of mild cases of food borne illnesses which occur in private homes go unreported. The U. S. Public Health Service cited the four most serious bacteria that cause these illnesses are *E. coli,* Salmonella, Listeria monocytogenes and *Campylobacter jejuni*[2]. These bacteria are commonly found in meat, poultry, eggs, and on vegetables.

Food borne illness is also extremely costly; the estimated yearly cost of food borne diseases in this country is $5 to $6 billion in direct medical expenditures and lost productivity, stated in an article in Patients Guide Index[3].

In an article dated Nov. 21, 2000 on CNN.com, Michael Doyle, Director of the Center for Food Safety at the University of Georgia states, "Most poultry contain harmful bacteria. Recent statistics show about 60% of chickens are contaminated with camplobacter and 10% with Salmonella. Turkeys tend to be slightly higher. It's important that we think about fresh poultry containing potentially harmful bacteria.[1]"

An estimated 55 percent of food poisoning cases are caused by improper cooking and storage of foods[4]. In poultry production, poultry handlers who do not wash their hands after going to the bathroom and returning to work can contaminate carcasses with *E. coli.* The carcass itself may be contaminated with Salmonella from the intestinal tract of the bird. While these small amounts of bacterial contamination may not be a danger in and of themselves, given the right conditions they can lead to serious illness or death.

It is well known that these harmful bacteria can be eliminated from food products by proper cooking regimens. In the case of poultry, cooking the product until it reaches an internal temperature of 165 degrees F. will kill the bacteria, and the food is considered safe for eating. Unfortunately, the USDA reports that 50% of cooks do not bother with a meat thermometer, which the USDA sees as a critical problem. Cooks who do not use thermometers rely on how the bird looks or use cooking charts on the packaging. These methods can be unreliable because oven temperatures vary so widely. The problem is further compounded by the practice of stuffing poultry prior to cooking it. The combination of poultry and stuffing increases cooking times. Additionally, it is common for home cooks to stuff the turkey using traditional recipes that include ingredients such as clams, oysters, turkey giblets and raw eggs, which carry their own bacteria as well. In an article from the Washington Post, Aug. 14, 1996, the USDA warns cooks not to stuff turkeys[5].

Meat thermometers can be used to verify proper internal cooked temperature. However, when poultry is stuffed, the poultry itself reaches the safe temperature of 165 degrees Fahrenheit (74 degrees Celsius) long before the stuffing itself. By the time the stuffing has reached 165 degrees F., the meat of the poultry has been overcooked and is less appetizing. Thus, poultry is often removed from the oven when the meat is done, resulting in improperly cooked stuffing. Other factors which contribute to contamination of food with bacteria include the practices of stuffing the turkey the night before, the use of raw meats and/or raw eggs in the stuffing, and improper sanitation methods such as poor hand washing.

A need exists for a device which will allow uniform cooking of the both the poultry product and the stuffing so that both reach the safe cooking temperature of 165 degrees F. at approximately the same time.

1. "Make Food Safety A Holiday Tradition," CNN Web Site, Nov. 21, 2000.
2. "Food Safety Myths and Facts," Patsy H. MacNeill, NC State University Cooperative Extension Web Site.
3. "Foodborne Diseases," Patient's Guide Web Site,.
4. "Food Poisoning", UC Davis Wellness Center Web Site.
5. "Stop That Stuffing! The USDA Issues an Early Thanksgiving Health Warning," Carole Sugarman, *Washington Post,* Aug. 14, 1996; page E1.

SUMMARY OF THE INVENTION

Consumers are aware of the risks of food borne illness when preparing stuffed poultry, yet continue prepare this food in the traditional way. An innovative convection poultry pipe is described, which when used in cooking stuffed poultry, causes the temperature of the stuffing to exceed the temperature of the turkey breast meat by allowing the heat from the oven to be convected through the center of the stuffing. This allows a rapid heating of the interior of the poultry and provides a safer end food product. Overall cooking time of both the poultry and the stuffing is reduced as a result of cooking the turkey from the inside as well as the outside.

The innovative convection poultry pipe disclosed in U.S. Pat. No. 6,416,804 B1 issued on Jul. 9, 2002 and in my copending U.S. Divisional patent application Ser. No. 10/190,259 filed Jul. 8, 2002 show an earlier form of convection poultry pipe. The present application relates to a modified hollow convection pipe where the adjoining pipe sections are improved with locking means to lock the pipe sections in unitary secured relation and in addition they have a new and improved convection pipe closure member provided to assist in the insertion of the pipe into the body cavity of a poultry that has been prestuffed with dressing so that the pipe can pass through the dressing without any dressing being lodged in the tubular pipe. After the multi-section convection pipe has been put in place, the cap or piercing end is to be removed so that the hollow convection pipe can form its normal cooking function, as previously described in aforesaid U.S. Pat. No. 6,416,804 B1.

The convection poultry pipe is provided with several features which allow it to be used on poultry of greatly varying size, from cornish hens to large turkeys. The device is provided in plural individual sections of tubing that are serially fitted and locked together in end to end relation. Overall length of the convection poultry pipe can be selectively adjusted by selecting greater or fewer numbers of sections of tubing to form the device. Since the device is formed of plural individual sections that are secured together in end to end relation using the same type of pin-slot connection at each joint between the sections and the cap. The angled mid portion may be provided as a fixed, or rigid angle, or may be provided as a selectively adjustable angle as shown in my earlier filed U.S. patent application (supra) to accommodate anatomical differences in various poultry products.

A method of cooking stuffed raw poultry is provided which includes piercing placement of a capped convection poultry pipe through the stuffed body cavity of the raw poultry prior to cooking such that the convection pipe is surrounded by and supported within the body cavity by the stuffing, removing the piercing cap and then cooking the stuffed poultry with the heat convection poultry pipe inside.

BRIEF DESCRIPTION OF THE DRAWINGS

FIG. 4 is a side view of the pipe shown in FIG. 1 with the section shown in assembled relation except for the cap end section.

FIG. 5 is a side view of a stuffed poultry showing the poultry convection pipe in full and dotted lines with the cap end shown removed and with arrows illustrating the oven heat being convected through the center of the stuffed poultry.

DETAILED DESCRIPTION

Figure 1:
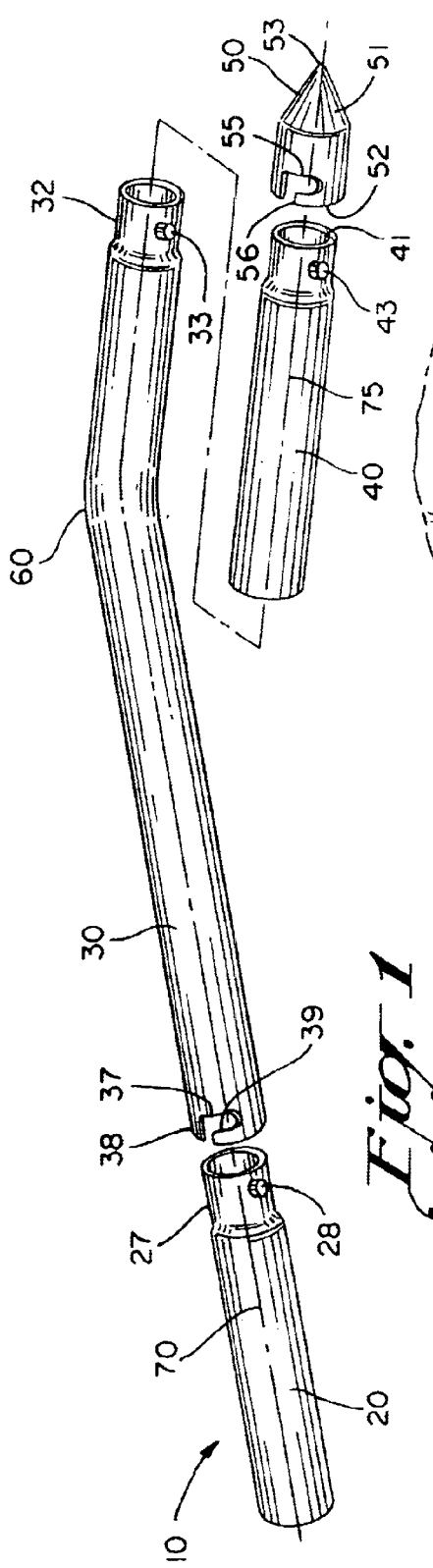
FIG. 1 is an exploded perspective view of my poultry convection pipe.
Figure 2:
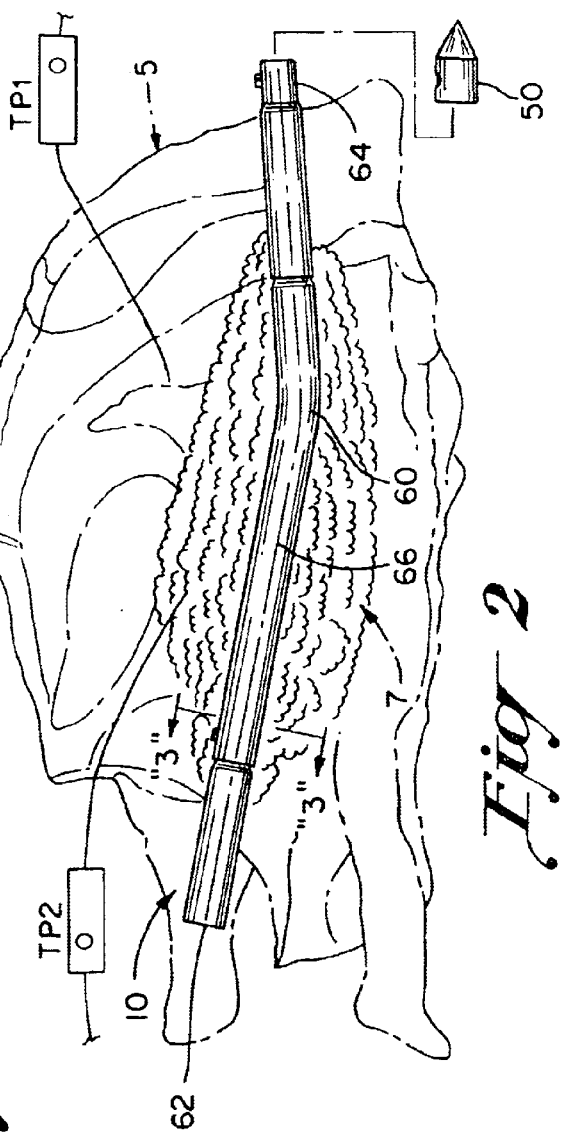
FIG. 2 is a side view of the assembled poultry convection pipe, with its piercing cap shown in assembly, illustrating its position and orientation within a typical stuffed poultry, the stuffed poultry being shown in phantom.
Figure 3:
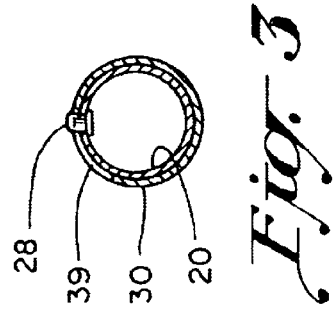
FIG. 3 is a sectional view of the poultry convection pipe across line 3—3 in FIG. 2, illustrating how the sections and cap are locked together using my pin-slot type connections to provide locked joints to secure the pipe components in unitary assembly together.

Referring now to FIGS. 1, 2, and 3, the inventive poultry convection pipe or tube or wand 10 is an elongate hollow tube of generally uniform diameter. Convection pipe 10 is constructed from a plurality of short, individual sections 20, 30, 40 of hollow tube. Each individual section 20, 30, 40 can be separated from the remaining sections, and in use are assembled together in series so as to form a single, elongate tube. Convection pipe 10 comprises pipe first end 62, pipe second end 64, and pipe mid portion 66 which lies between and separates pipe first end 62 from pipe second end 64.

Pipe first end 62 comprises a first longitudinal axis 70. Pipe second end 64 comprises a second longitudinal axis 75. First longitudinal axis 70 is non-parallel to second longitudinal axis 75, and first longitudinal axis 70 intersects second longitudinal axis 75 in pipe mid portion 66 (FIG. 2) so as to form angle 60.

In the preferred embodiment, convection pipe 10 is used within a large turkey 5 which has been eviscerated and the body cavity filled with stuffing 7. Convection pipe 10 can be supported within the body cavity, and surrounded by, stuffing 7 but with the use of piercing or pointed cap 50, the body cavity can be stuffed and then the convection pipe 10 can be pushed through the cavity and then the cap 50 can be removed before the cooking process is commenced. The cap 50 prevents stuffing from entry into the tube sections 20, 30 and 40 to avoid possible clogging of the convection pipe 10 with dressing. Convection pipe 10 is provided in a length such that pipe first end 62 extends outside the body cavity adjacent to the tail end of turkey 5, and pipe second end 64 extends outside the body cavity adjacent to the neck end of turkey 5. Preferably, angle 60 is positioned within the body cavity so as to lie adjacent to the neck end, in the narrow opening between the breastbone and back of turkey 5. When properly oriented and supported by stuffing 7, first end 62 of convection pipe 10 lies above both angle 60 and second end 64. Most preferably, second end 64 lies at, or slightly below, the horizontal plane.

In the preferred embodiment, convection pipe 10 comprises at least three individual sections 20, 30, 40 of elongate hollow tube of circular cross section, the elongate hollow tube having a circular longitudinal bore such that air flow from the first end to the second end is free and uninterrupted. These three sections comprise a first section 20, a second angled midsection 30, and a third section 40 which coacts with midsection 30 to provide an extension of the angled section. Employment of three individual sections to form convection pipe 10 is excellently suited for use in cooking stuffed duck, chicken, and turkey.

First section 20 and third section 40 each are provided with a first outer diameter and a first inner diameter, an open section first end 22, 42, an open section second end 24, 44, a section mid portion 26, 46 which lies between the open section first end 22, 42 and the open section second end 24, 44, an interior surface 23, 43, and an exterior surface 25, 45. Second section 30 is provided with a second outer diameter and a second inner diameter, an open section first end 32, an open section second end 34, a section mid portion 36 which lies between the open section first end 32 and the open section second end 34, an interior surface 33, and an exterior surface 35.

According to important features of my invention, the convection tube or pipe 10 in FIGS. 1 and 4 is comprised of a series of sections, as previously discussed. These sections have locking means or pin-slot connections for connecting the sections 20, 30 and 40 and the cap 50 in end-to-end relationship. The locking means or pin-slot connections that are illustrated in FIG. 1 for accomplishing this end are essentially the same for each of the sections in terms of the details of construction. More specifically, the section 20 has a reduced section end 27 and a section locking pin 28. The reduced section end has a diameter slightly smaller than the corresponding open end of the angled midsection 30 for telescoped nested engagement with the adjacent sections. The midsection 30 is possessed of a reduced section end 32 and a section locking pin 33 at its opposite end.

Similarly, section 40 also has a reduced section end 41 and a section locking pin 43.

The reduced end 41 is sized and shaped for nested engagement with any adjacent section, as is also the case for the reduced section end 32.

Sections 30, 40 and end cap 50 are each provided with so-called section lock slots. To this end, the angled section 30 has a section lock slot 37, a section slot entry 38 and a section slot retaining shoulder 39. The shoulder is curved in a circumferential direction. When the section 20 is to be assembled with the angled section 30, the pin 28 is engaged in the section slot entry 38 and is circumferentially turned and engaged behind the section slot retaining shoulder 39 to secure these sections 20 and 30 in locked assembly.

Similarly, as just described, reduced section end 32 of the angled section 30 can be assembled with the end section 40 by engaging its section locking pin 33 into section lock slot 47 by causing the pin 33 to enter the section slot entry 48 (FIG. 4) and when the sections 30 and 40 are turned in circumferentially opposite directions, the section locking pin 33 can then be engaged behind the section slot retaining shoulder 39 to complete locked assembly of these components.

Finally, the cap 50 can be assembled with the section 40. The cap 50 has a closed end 51 and an open end 52. The closed end 51 is provided with a cap piercing point 53. To assemble the end section 40 with the cap, these components can again be placed in axial alignment with the reduced end 41 engageable within the open end 52 of the cap 50 after aligning the pin 43 with section lock slot 55 and more particularly with section slot entry 56. When the cap 50 is pushed axially over the reduced end, the pin 43 becomes lodged more deeply in the slot 55 and the pin can then be moved behind circumferentially curved shaped slot retaining shoulder 57 when the cap is circumferentially rotated relative to angled section 40 thus completing the assembly of these two members. The cap 50 can be disengaged from the convection pipe by circumferentially rotating the cap in the opposite direction freeing the pin 43 from behind the shoulder to then permit the pin to pass through the slot entry 56.

The other sections can be similarly disengaged by rotation of the various sections relative to one another as just described with respect to the disengagement of the cap from the end section 40.

If desired, a modified locking means can be used. To this end, a dimple-groove connection can be used to connect the aligned sections rather than the pin-slot type of connection illustrated in the drawings without departing from the scope of my invention.

Thus, the over all length of convection pipe 10 may be adjusted in two different ways. Gross adjustment is accomplished by selecting a combination of two, three, or four individual sections to accommodate poultry size.

Figure 6:
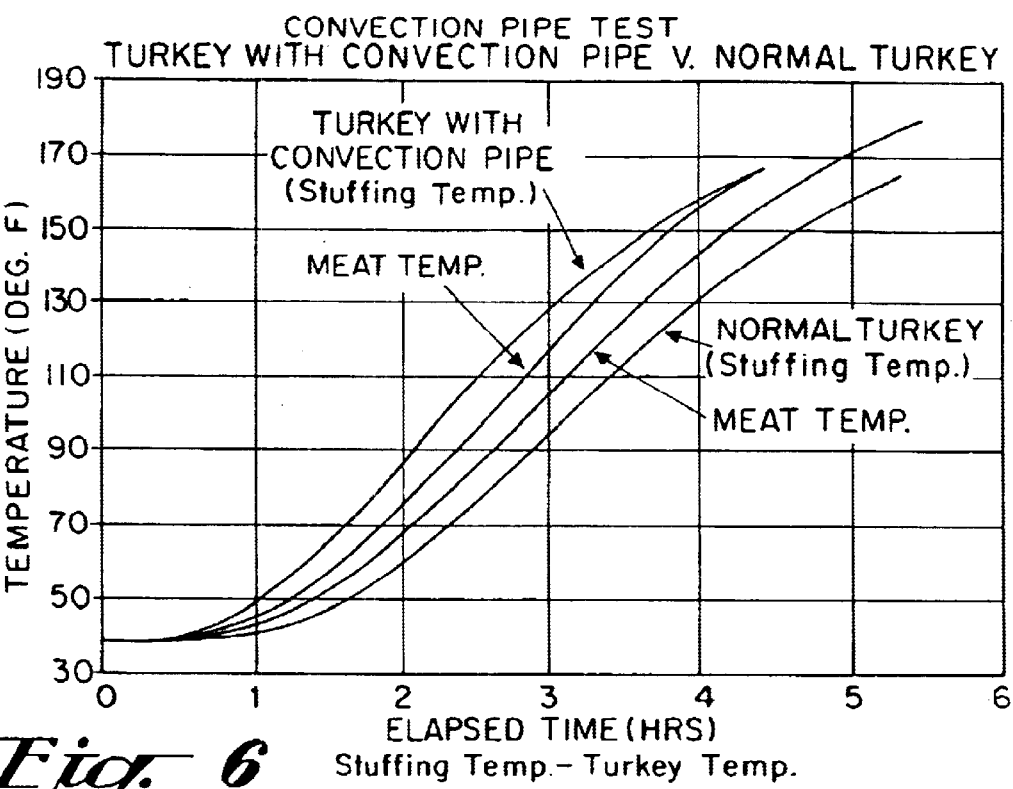
FIG. 6 is a chart entitled CONVECTION PIPE TEST TURKEY V. NORMAL TURKEY illustrating important cooking advantages where the turkey is cooked using my convection pipe or wand as opposed to normal cooking without the convection pipe.

Convection pipe 10 is preferably formed of stainless steel, and is provided with an outer diameter which is generally in the range of ⅝ inch to 34 inch. This range is suitable for use in large stuffed poultry, such as a turkey. However, it is well within the scope of this invention to provide a convection pipe 10 which has a much smaller general outer diameter so as to accommodate much smaller poultry, such as cornish hens or a fryer chicken. It is also well within the scope of this invention to provide a convection pipe 10 which is formed from alternative materials when those materials can provide heat transfer properties which are similar to metal. In the preferred embodiment, convection pipe 10 is provided having at least a ⅝ inch diameter so as to ensure unrestricted airflow through the stuffed poultry during cooking. This convective airflow, shown using arrows in FIG. 5, allows the stuffing and interior of the poultry to cook at approximately the same rate as its exterior. FIG. 6 is a chart which illustrates the improvement in overall cooking rate, as well as uniformity of cooking rate between the internal (stuffing) and exterior (breast meat) temperatures over time, when poultry is cooked using the innovative convection pipe 10. Thus, both the breast meat and stuffing reached a safe cooking temperature at approximately the same time, and much sooner than a stuffed poultry which was cooked without the inventive device.

A method for using the convection pipe 10, 100 to quickly and uniformly cook an eviscerated and stuffed raw poultry 5 is now detailed in the following method steps:

1. Thoroughly wash the eviscerated body cavity and exterior of a poultry, and season as desired.
2. Fill the body cavity with edible stuffing material 7 such that the convection pipe 10 is surrounded by and supported within the body cavity by the edible stuffing material 7, and so that the edible stuffing material 7 maintains convection pipe 10 in the desired orientation.
3. Based on the overall size of poultry, determine the minimum number of individual sections 20, 30, 40 required to form a convection pipe which extends completely through the body cavity of poultry allowing approximately 1 inch of convection pipe to extend beyond both of the respective neck and tail ends of poultry (FIGS. 2 and 5). Secure the individual sections 20, 30, 40 together with the pointed cap 50 as previously described using the pin-slot connections.
4. Push the convection pipe 10 with the piercing cap 50 leading the way through the body cavity of the stuffed poultry and adjust the overall length of the convection pipe 10 and the positions of each of the individual sections 20, 30, 40 of the hollow elongate tube relative to the remaining sections and to poultry, by applying a longitudinal pressure, in the appropriate direction, on each of the individual sections of hollow elongate tube, such that
   A. the first end 62 of the convection pipe 10 extends out of the tail end of poultry such that the open first end 62 of the convection pipe 10 is spaced apart from the tail end of poultry,
   B. the second end 64 of the convection pipe 10 extends out of the neck end of poultry such that the open second end 64 is spaced apart from the neck end of poultry, and
   C. the angled portion 60 of the convection pipe 10 resides within the body cavity of poultry such that angled portion 60 lies adjacent to the neck end, and lies within the narrow opening between the breastbone and back of poultry.
5. Remove the cap 50 from the tube section 40.
6. Adjust the angled portion 60 such that the first end 62 of the convection pipe 10 lies above both the angled portion 60 and the second end 64, and the second end 64 lies at, or slightly below, the horizontal plane by applying a transverse pressure to each respective first 62 and second 64 ends of the convection pipe 10.
7. Cook poultry 5 until the internal temperature of the edible stuffing material 7, poultry breast, and poultry thigh are each 165 degrees F. Use of convection pipe 10 provides convective airflow through poultry 5 and its stuffing 7, shown using arrows in FIG. 5. This convective airflow allows the stuffing and interior of the poultry to cook at approximately the same rate as its exterior. As shown in FIG. 6, poultry cooked using convection pipe 10 reach 165 degrees F. in a shorter time, and in a uniform manner so that the poultry meat and stuffing reach the safe temperature at approximately the same time.

Testing of Angular Convection Pipe

Introduction.

A test has been run to provide a comparative analysis of the cooking times for three turkeys. The testing was intended to determine the cooking rate differences for similar sized "stuffed" turkeys utilizing the convection pipe or wand product when compared to a similar-sized turkey with no convection pipe or wand.

Procedure.

The three turkeys received were reportedly the same product with similar packaged weights. The turkeys received for testing had been prepared including cleaning prior to the test. The turkeys were delivered to the laboratory 15 hours prior to testing and were placed in a laboratory refrigerator to allow the turkeys to attain similar temperatures prior to the actual tests. Bread stuffing was prepared for insertion into the cavity of the individual turkeys immediately prior to testing (cooking).

The turkeys for tests A and B were received on Dec. 19, 2002. The turkey identified as C (see Table below) was received on Dec. 26, 2002. The actual tests were performed on the following day after receipt.

The turkeys were weighed prior to stuffing to verify cooking weights. The stuffing was weighed for each turkey prior to insertion of the stuffing in the cavity. The weights of turkey and stuffing are presented as follows:

| Turkey Sample | Turkey Weight (Lbs.) | Stuffing Weight (Lbs.) | Total Weight Prior to Cooking (Lbs.) |
|---|---|---|---|
| A Stuffed No Convection Pipe | 14.8 | 3.15 | 18.0 |
| B Stuffed Convection Pipe | 14.9 | 3.15 | 18.1 |
| C | 15.1 | 3.15 | 18.3 |

In order to monitor the temperature differences within the oven during cooking, rigid conventional thermocouples were installed at two locations. One was installed adjacent to the oven internal thermocouple on the upper rear portion of the oven. The second thermocouple was attached on the front lower portion of the oven grate used to support the turkey during the test. The temperatures at the two locations within the oven were monitored during the cooking cycles. The oven temperature did not vary appreciably between each cooking cycle. The oven was set at 350° F. and allowed to preheat for 30 minutes prior to introducing the prepared turkey.

Two semi-rigid thermocouples (conventional temperature probes) are diagrammatically illustrated in FIG. 2 at TP1 and TP2 were placed in each turkey prior to cooking. One probe TP1 was placed in the breast portion at a point not touching any bone. The second probe TP2 was inserted in the center portion of the stuffed cavity. The temperatures were monitored and recorded during the cooking cycle. The cooking continued until the temperature of the turkeys reached a "target" internal temperature of 165° F. The testing of turkeys A and B was terminated when the breast probe reached the target temperature. The testing of turkey C was terminated when the internal stuffed cavity reached the target temperature of 165° F.

In order to minimize temperature fluctuations during the cooking cycle, the oven was only opened once during each cooking cycle. At approximately 2 hours of cooking, the oven door was opened in order to remove the foil covering. This slight dip in oven temperature was observed when the oven was opened.

FIGS. 1–6 show turkey samples with and without the convection pipe installed prior to cooking and immediately upon removal from the oven after reaching the target temperatures. The placement of the individual temperature probes is clearly visible. (See FIG. 5) FIGS. 7 and 8 show the placement of the turkey within the oven both with the foil cover and after removal.

Results.

Figure 7:
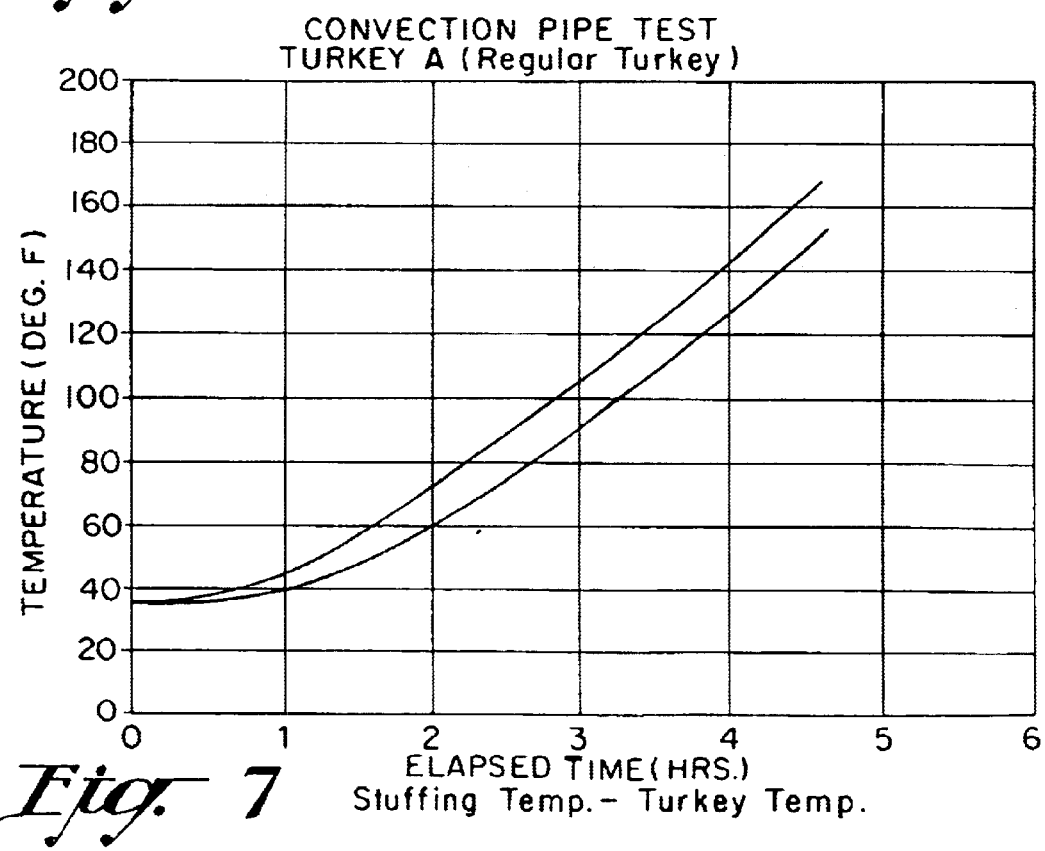
FIG. 7 is a further chart entitled CONVECTION PIPE TEST TURKEY A (REGULAR TURKEY).
Figure 8:
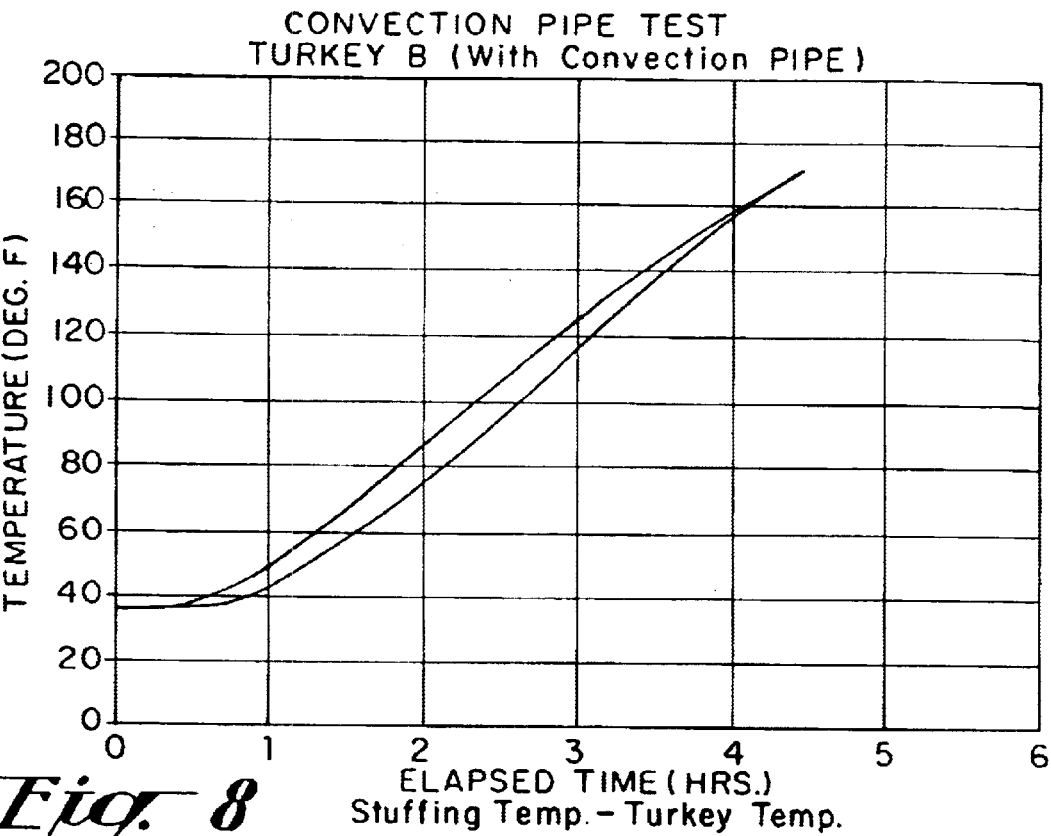
FIG. 8 is another chart entitled CONVECTION PIPE TEST TURKEY B (WITH CONVECTION PIPE).
Figure 9:
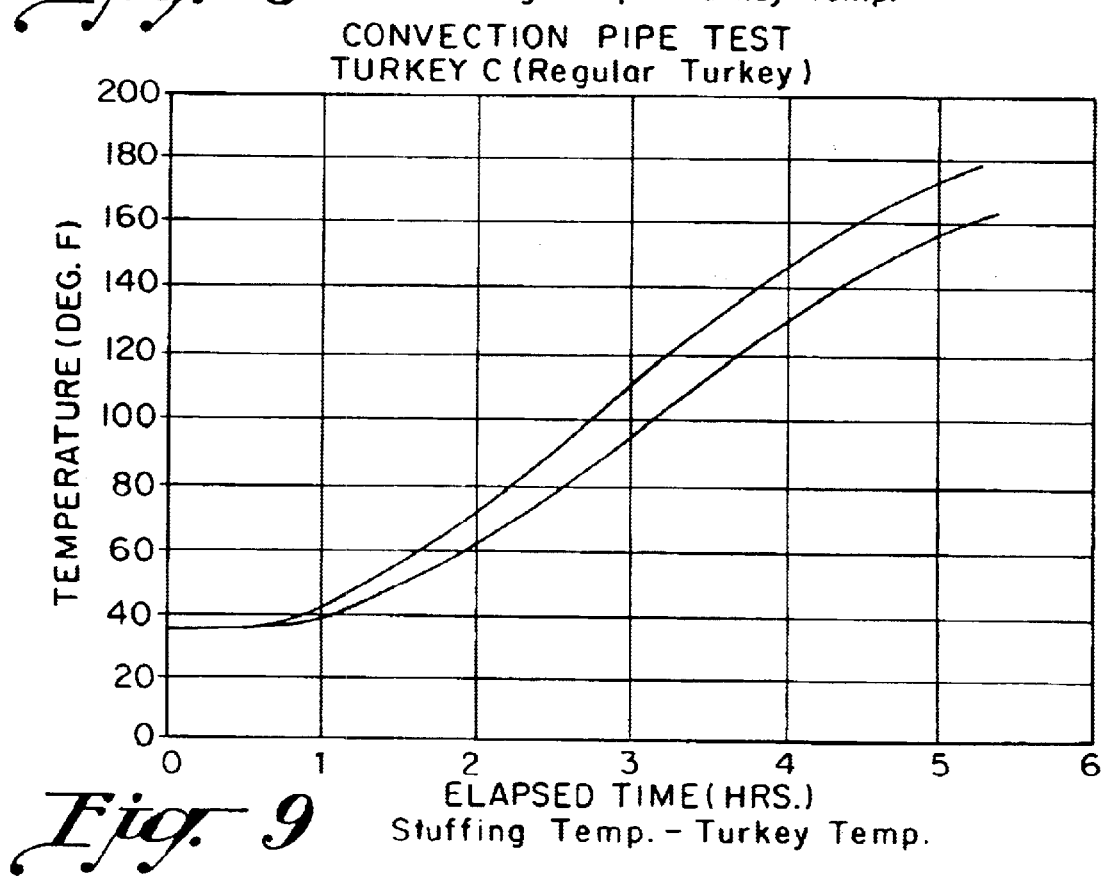
FIG. 9 is yet another chart entitled CONVECTION PIPE TURKEY C (REGULAR TURKEY).

The results for the testing of the three turkey samples are shown in graphs illustrated in FIGS. 6, 7 and 8. A graph showing time (hours) vs. temperature (° Fahrenheit) was generated for each of the three turkeys. The graphs show the temperature for both the breast meat and the cavity probes. An additional graph showing a direct comparison of the cooking cycles for turkeys B (with convection pipe) and C (no convection pipe) is includes in FIGS. 6, 7 and 8. This concludes the comparative testing of the turkey samples.

While changes may be made in the detail construction and in the method of implementation within the skill of those knowledgeable in the art, it shall be understood that such changes shall be within the spirit and scope of the present invention, as defined by the appended claims.

I claim:

1. An apparatus for fast and uniform cooking of stuffed poultry, the apparatus comprising an elongate hollow convective tube of uniform diameter, the elongate hollow tube having an open first end, an open second end, a mid portion which separates the first end from the second end, a tube wall which separates the hollow interior from the exterior, the first end comprising a first longitudinal axis, the second end comprising a second longitudinal axis, wherein said first longitudinal axis is non-parallel to the second longitudinal axis, and wherein said first longitudinal axis intersects the second longitudinal axis so as to form an angled portion, the angled portion residing within the mid portion, a closed ended cap having a pointed end for piercing poultry dressing in a stuffed poultry, the closed ended cap being in removable coaxial assembly with said second end and when removed permitting convective cooking of stuffed poultry.

2. The apparatus of claim 1 wherein said elongate hollow tube comprises a plurality of short, individual, and separable sections of the hollow tube, each of the plurality of sections of the hollow tube comprising a section first end, a section second end, and a section mid portion which separates the section first end from the section second end, one of said plurality of sections of the hollow tube comprising said angled portion residing within its section mid portion, locking means securing each of the plurality of sections of hollow tube in locked assembly with one another in series with the remaining sections of the plurality of sections of hollow tube such that when all individual sections of each of the plurality of sections are joined section first end to adjacent section second end.

3. The apparatus of claim 1 wherein means is provided to secure said cap in detachable assembly with one end of said convective.

4. The apparatus of claim 2 wherein said plurality of sections of hollow tube comprises at least two sections of hollow tube.

5. The apparatus of claim 2 wherein said plurality of sections of hollow tube comprises at least three sections of hollow tube.

6. The apparatus of claim 3 wherein said elongate hollow convective tube has an outer diameter in the range of ⅝ inch to ¾ inch.

7. The apparatus of claim 3 wherein said lock means comprises a pin and slot connection, the tube sections to be locked having a radially extending pin engaged in an open ended axially extending slot, the tube sections being connected manually rotatable to engage the pin behind an axially facing shoulder in locked engagement.

8. The apparatus of claim 3 wherein said angled portion is rigid and nonadjustable such that said first longitudinal axis intersects the second longitudinal axis at an angle of 22.5 degrees.

9. A combination cooking device and stuffed poultry, wherein the stuffed poultry comprises a dressed poultry comprising a tail end, a neck end, and an eviscerated body cavity filled with edible stuffing, wherein the cooking device comprises an elongate hollow tube of uniform diameter, the elongate hollow tube comprising a first end, a second end, a mid portion, the elongate hollow tube comprising an angled portion located in the mid portion thereof, and a closed ended cap having a pointed cap end for piercing poultry dressing in a stuffed poultry without allowing dressing to clog the tube, the closed ended cap having cap attachment means for securing the closed ended cap in removable coaxial assembly with said second end to then permit the cooking of the stuffed poultry, the cooking device positioned within the body cavity of the stuffed poultry such that it is surrounded by and supported by the stuffing, such that the first end of said elongate hollow tube extends out from the tail end of the stuffed poultry, such that the second end of said elongate hollow tube extends out from the neck end of the stuffed poultry, and such that the second end and the angled portion lie below the first end, the cooking device being open and unobstructed so that air can pass freely through the cooking device.

10. The combination cooking device and stuffed poultry of claim 9 wherein the cap is provided with detachable locking means for joining said cap to said second end.

11. A cooking device for quick and uniform cooking of stuffed poultry, the cooking device comprising a combination of multiple individual sections of elongate hollow tube, each individual section of said multiple individual sections comprising an open section first end, an open section second end, a section mid portion which separates the section first end from the section second end, and a conical shaped piercing cap, one section of said multiple individual sections comprising an angled portion residing within its section mid portion such that its section first end is not coaxial with its section second end, section locking means connecting said sections in series in end-to-end relation, the thus joined sections providing a single elongate hollow tube which is generally uniform in diameter.

12. The cooking device of claim 11 wherein said angled portion is rigid.

13. The cooking device of claim 11 wherein said conical shaped piercing cap has a closed pointed end to leave the convection tube free of dressing to prevent clogging of the tube as the turkey is pierced, the cap being disconnected from the tube during a cooking procedure to allow heated air flow therethrough.

14. The cooking device of claim 13 wherein detachable locking means connects the individual sections in end-to-end relation.

15. The cooking device of claim 14 wherein when each individual section is assembled with the remaining individual sections the result is a single elongate hollow tube which is generally uniform in diameter and comprises an outer diameter in the range of ⅝ inch to ¾ inch.

16. An apparatus for fast and uniform cooking of stuffed poultry, the apparatus comprising an elongate hollow tube of uniform diameter, the elongate hollow tube having an open first end, an open second end, a mid portion which separates the first end from the second end, a tube wall which separates the hollow interior from the exterior, the first end comprising a first longitudinal axis, the second end comprising a second longitudinal axis, wherein said first longitudinal axis is non-parallel to the second longitudinal axis, and wherein said first longitudinal axis intersects the second longitudinal axis so as to form an angled portion, the angled portion residing within the mid portion a closed ended cap having a pointed cap end for piercing poultry dressing in a stuffed poultry without allowing dressing to clog the tube, the closed ended cap having cap attachment means for securing the closed ended cap in removable coaxial assembly with said second end to then permit the cooking of the stuffed turkey.

17. An apparatus for fast and uniform cooking of stuffed poultry, the apparatus comprising an elongate hollow heat convective tube of uniform diameter, the elongate hollow tube having an open first end, an open second end, a mid portion which separates the first end from the second end, a tube wall which separates the hollow interior from the exterior, the first end comprising a first longitudinal axis, the second end comprising a second longitudinal axis, wherein said first longitudinal axis is non-parallel to the second longitudinal axis, and wherein said first longitudinal axis intersects the second longitudinal axis so as to form a tubular angled portion, positioned between opposite ends of the elongate hollow convection tube, a closed ended cap having a pointed end for piercing poultry dressing in a stuffed poultry, the closed ended cap being in removable coaxial assembly with one of said ends of said tube and when removed permitting the cooking of stuffed poultry.

18. The apparatus of claim 17 wherein said elongate hollow tube comprises a plurality of individual, and separable sections and a series of pin-slot connections joining said sections together in end-to-end relation.

* * * * *